United States Patent
Cheng et al.

(10) Patent No.: US 8,722,810 B2
(45) Date of Patent: May 13, 2014

(54) MODIFIED HIGH CIS CONJUGATED DIENE COPOLYMER AND PREPARING METHOD OF THE SAME

(71) Applicant: Chi Mei Corporation, Tainan (TW)

(72) Inventors: Kuei-Lun Cheng, Tainan (TW); Chih-Cheng Lee, Tainan (TW); Kuan-Lin Hsieh, Tainan (TW)

(73) Assignee: Chi Mei Corporation, Tainan (TW)

( * ) Notice: Subject to any disclaimer, the term of this patent is extended or adjusted under 35 U.S.C. 154(b) by 0 days.

(21) Appl. No.: 13/705,265

(22) Filed: Dec. 5, 2012

(65) Prior Publication Data

US 2013/0172492 A1 Jul. 4, 2013

(30) Foreign Application Priority Data

Dec. 30, 2011 (TW) .............................. 100150013 A

(51) Int. Cl.
*C08F 8/34* (2006.01)

(52) U.S. Cl.
USPC ......... 525/331.9; 525/350; 525/345; 525/346

(58) Field of Classification Search
CPC ..................................... C08F 8/34; C08F 8/00
See application file for complete search history.

(56) References Cited

U.S. PATENT DOCUMENTS

| | | | | |
|---|---|---|---|---|
| 2,964,502 A * | 12/1960 | Wheelock | ........................ | 526/75 |
| 3,144,422 A * | 8/1964 | Homberg | ...................... | 524/302 |
| 3,240,844 A * | 3/1966 | Gruver | ........................... | 525/260 |
| 3,294,768 A * | 12/1966 | Wofford | ........................ | 526/174 |
| 3,338,810 A * | 8/1967 | Warner | ........................... | 522/33 |
| 3,484,355 A | 12/1969 | Warner | | |
| 3,627,529 A * | 12/1971 | Frank et al. | .................... | 430/253 |
| 3,640,923 A * | 2/1972 | Guthrie | ............................ | 522/28 |
| 3,660,365 A * | 5/1972 | Onishi et al. | .................. | 526/120 |
| 3,790,539 A * | 2/1974 | Onishi et al. | .................. | 526/122 |
| 3,819,590 A * | 6/1974 | Onishi et al. | .................. | 526/132 |
| 4,234,676 A * | 11/1980 | Hein et al. | ................. | 430/286.1 |
| 4,520,177 A | 5/1985 | Jenkins | | |
| 4,544,718 A | 10/1985 | Yeh et al. | | |
| 4,808,638 A * | 2/1989 | Steinkraus et al. | ............. | 522/24 |
| 5,064,910 A | 11/1991 | Hattori et al. | | |
| 5,070,150 A | 12/1991 | Hopper | | |
| 5,220,045 A | 6/1993 | Knauf et al. | | |
| 6,359,046 B1 * | 3/2002 | Cruse | ............................ | 524/262 |
| 6,509,418 B1 * | 1/2003 | Zook et al. | ..................... | 525/212 |
| 8,017,720 B2 * | 9/2011 | Bojkova et al. | ............... | 528/375 |
| 8,053,512 B2 * | 11/2011 | Thiele et al. | .................... | 524/571 |
| 2003/0105222 A1 * | 6/2003 | Choi et al. | ..................... | 524/801 |
| 2004/0249026 A1 * | 12/2004 | Tsuji et al. | ...................... | 524/81 |
| 2007/0055024 A1 * | 3/2007 | Hogan et al. | ............... | 525/333.9 |
| 2009/0286002 A1 * | 11/2009 | Iezzi et al. | ..................... | 427/508 |
| 2009/0292043 A1 * | 11/2009 | Kurazumi et al. | ............. | 523/152 |
| 2010/0069568 A1 * | 3/2010 | Thiele et al. | .................... | 524/571 |
| 2010/0105827 A1 * | 4/2010 | Tanaka et al. | ................. | 524/566 |

FOREIGN PATENT DOCUMENTS

TW    I273106    2/2007

OTHER PUBLICATIONS

English Abstract translation of TWI273106 (Published Feb. 11, 2007).
TW Office Action dated Nov. 15, 2013.

* cited by examiner

*Primary Examiner* — Robert S Loewe
(74) *Attorney, Agent, or Firm* — McClure, Qualey & Rodack, LLP

(57) ABSTRACT

A modified conjugated diene copolymer and a preparing method for the same are provided. The method comprising a polymerization step for polymerizing conjugated diene monomers to form a conjugated diene polymer; and a modifying step for reacting the conjugated diene polymer with a modifier to form a modified conjugated diene polymer. The modifier includes a polythiol ester compound, a polythiol alkane compound or a combination thereof, the polythiol ester compound has a chemical formula (I):

$$Ra\text{-}(O\text{---}C(\!=\!O)Rb\text{-}SH)x \qquad (I).$$

The polythiol alkane compound has a chemical formula (II):

$$HS\text{---}(CH_2)_m\text{---}(Rd)_n CH_2 SH \qquad (II).$$

18 Claims, No Drawings

MODIFIED HIGH CIS CONJUGATED DIENE COPOLYMER AND PREPARING METHOD OF THE SAME

This application claims the benefit of Taiwan application Serial No. 100150013, filed Dec. 30, 2011, the subject matter of which is incorporated herein by reference.

BACKGROUND

1. Technical Field

The invention relates to a polymer and more specifically to a modified high cis conjugated diene polymer.

2. Description of the Related Art

Conjugated diene polymer is widely used for resin modifying applications and various industrial goods. One of use is for manufacturing tires. Demand for low fuel consumption and attrition for the tires has increased with increasing environmental consciousness. For conforming the demand trend, the rolling resistance property, the wet traction property, the tensile strength property, etc. of mechanical characteristics of the conjugated diene polymer are very important.

The conjugated diene polymer having high content of cis-1,4 structure has good mechanical characteristics. There are many conventional methods for manufacturing the conjugated diene polymer having high content of the cis-1,4 structure. In those methods, catalysts formed by a combination of a metal compound, such as a Ni series, a Ti series, a Co series, a La series, etc. and an organic aluminum compound, are usually used.

The method for manufacturing the high cis conjugated diene polymer by using a lanthanide series metal has been increased to a mass production since the year of nineteen nineties. The conjugated diene polymer having high content of cis structure formed by a polymerization process using the lanthanide series metal compound as the catalyst composition has perfect linearity of the polymer chain and heavier molecular weight. Therefore, the conjugated diene polymer having high content of cis structure can be applied to applications of the tires, industrial goods. In addition, the conjugated diene polymer having high content of cis structure can be used for manufacturing goods having impact resistance.

There is no limit to methods for manufacturing a conventional catalyst composition of lanthanide series metal carboxylate. For example, the methods disclosed in U.S. Pat. No. 4,544,718, U.S. Pat. No. 4,520,177 or U.S. Pat. No. 5,220,045, etc may be used. Preferably, the lanthanide series metal compound may be manufactured by using materials of a lanthanide series metal oxide, an organic carboxylic acid and a huge amount of water. The lanthanide series metal oxide may use $Nd_2O_3$, $Pr_{11}O_{16}$, or $Ce_2O_3$, etc. The organic carboxylic acid is neodecanoic acid, lauric acid, tetradecanoic acid, or naphthenic acid, etc.

Currently, carbon black is added to the conjugated diene polymer to increase the strength of the tires. In recent years, due to the depletion of oil resource and the global warming issue, the industries have many methods by using silica as a reinforcing filler. In comparison with carbon black, silica is more difficult to be uniformly distributed in conjugated diene polymer. Therefore, the compatibility between silica and conjugated diene polymer needs to be further increased. According to one improvement method, when adding silica to the conjugated diene polymer during the manufacturing process of tires, a modifier is used to perform blending. However, since the blending uniformity largely affects the properties of the products, product quality may differ from batch to batch, and quality reproducibility is poor. Moreover, it is hard to make sure if the conjugated diene polymer is modified by the modifier, or the modifier only reacts with silica. Therefore, it is a prominent task for the industries to research a method for preparing the conjugated diene polymer with well dispersion property of silica.

SUMMARY

A method for preparing a modified conjugated diene polymer is provided. The method comprises following steps. A conjugated diene polymer is formed by a polymerization step. The conjugated diene polymer reacts with a modifier to form a modified conjugated diene polymer by a modifying step in the presence of an accelerator. The modifier includes a polythiol ester compound, a polythiol alkane compound or a combination thereof. The polythiol ester compound has a chemical formula (I):

$$R_a\text{-(O—C(=O)}R_b\text{-SH)}_x \qquad (I).$$

Ra is a x-valent aliphatic hydrocarbon residue with 4~8 carbon atoms, a cyclo aliphatic hydrocarbon residue with 5~10 carbon atoms, or an aromatic hydrocarbon residue with 6~9 carbon atoms. Rb is an aliphatic hydrocarbon residue with 1~15 carbon atoms. x is an integer of 2~4.

The polythiol alkane compound has a chemical formula (II):

$$\text{HS—(CH}_2)_m\text{—(R}d)_n\text{CH}_2\text{SH} \qquad (II).$$

m and n are independently an integer of 0~10.

Rd has a structural formula (III):

a is an integer of 0~10. b is an integer of 0~1.

A modified high cis conjugated diene polymer is provided. The modified high cis conjugated diene polymer is prepared by said method.

BRIEF DESCRIPTION OF THE DRAWINGS

None

DETAILED DESCRIPTION

A modified high cis conjugated diene polymer according to the present invention is provided. The modified high cis conjugated diene polymer is manufactured by a method comprising: a polymerization step for polymerizing conjugated diene monomers to form a high cis conjugated diene polymer; and a modifying step for reacting the high cis conjugated diene polymer with a modifier to form the modified high cis conjugated diene polymer.

In one embodiment, a weight average molecular weight of the modified high cis conjugated diene polymer is 20,000~1,000,000. The modified high cis conjugated diene polymer has a cis-1,4-structure over 97%.

In another embodiment, the high cis conjugated diene polymer is formed by polymerizing the conjugated diene monomers. The conjugated diene monomers comprise 1,3-butadiene, isoprene, 2-phenylbutadiene, 2,3-dimethylbutadiene, 1,3-hexadiene, 1,3-octadiene, etc. or a combination thereof.

In another embodiment, the conjugated diene monomers may be polymerized in the presence of a catalyst composition. The catalyst composition is composed of (a) a lanthanide series metal organic carboxylate, (b) an organic aluminum compound and (c) a Lewis acid.

The above mentioned (a) lanthanide series metal organic carboxylate comprise: neodymium trichloride, didymium trichloride which is composed of 72 wt % of neodymium, 20 wt % of lanthanum and 8 wt % of praseodymium, neodymium 2-ethylhexanoate, didymium 2-ethylhexanoate, neodymium naphthenate, neodymium 2,2-diethylhexanoate, neodymium trimethacrylate, a polymer of neodymium trimethacrylate, or neodymium neodecanoate and so on.

In addition, the (b) organic aluminum compound is composed of an aluminium alkyl having a molecular formula of AlR'$_3$, HAlR'$_2$ or R'AlH$_2$. R' is an alkyl group with 2~6 carbon atoms. For example, the (b) organic aluminum compound comprises trimethylaluminum, triethyl aluminum, triisopropylaluminum, tributylaluminum, triisobutylaluminum, trihexylaluminum, tricyclohexylaluminum, tri-n-octyl aluminum, diethylaluminum hydride, dipropylaluminum hydride, dibutylaluminum hydride, di-isobutyl aluminum hydride (DIBAH), ethylaluminum dihydride, propylaluminum dihydride or isobutylaluminum dihydride, etc. Preferably, the (b) organic aluminum compound is composed of the aluminium alkyl having a molecular formula of AlR'$_3$ or HAlR'$_2$.

In another embodiment, the (c) Lewis acid is composed of an alkylaluminum halide. The (c) Lewis acid may have a structural formula of R"AlCl$_2$, R"$_3$Al$_2$Cl$_3$ or R"$_2$AlCl, etc. R" is a hydrocarbon group with 8~12 carbon atoms. For example, the (c) Lewis acid comprise dimethylaluminum chloride, diethylaluminum chloride, di-isobutyl aluminum chloride (DIBAC), dioctylaluminum chloride, ethylaluminum sesquichloride, ethylaluminum dichloride, or a bromide or iodide thereof.

A ratio between the each catalyst material of the catalyst composition has to be limited for obtaining a high cis conversion ratio for the polymerization for the high cis conjugated diene polymer. For example, a mole of the (a) lanthanide series metal organic carboxylate: a total mole of the (c) Lewis acid and the (b) organic aluminum compound is 1:1.5~1:100, preferably 1:1.5~1:60. In some embodiments, a mole of neodymium neodecanoate: a total mole of diethylaluminum chloride and di-isobutyl aluminum hydride is 1:11. The mole of the (a) lanthanide series metal organic carboxylate: the mole of the (c) Lewis acid is controlled to be 1:0.5~1:10 preferably. In some embodiments, the mole of neodymium neodecanoate: the mole of diethylaluminum chloride is controlled to be 1:3.

In another embodiment, the catalyst composition may comprise: a solution of the (a) lanthanide series metal organic carboxylate, a solution of the (c) Lewis acid and a solution of the (b) organic aluminum compound. The solution of the (b) organic aluminum compound is obtained by well mixing the (b) organic aluminum compound and a proper solvent. A process temperature for the catalyst composition is controlled according to a melting point and a boiling point of the solvent, to be −20° C.~120° C. preferably. The above mentioned catalyst substances may be applied into the mixer respectively. Preferably, after the (b) organic aluminum compound and the (a) lanthanide series metal organic carboxylate are added, the (c) Lewis acid is added into the mixer. In some embodiments, the (b) organic aluminum compound and the (a) lanthanide series metal organic carboxylate may be mixed together before the polymerization step.

In another embodiment, in the step for preparing the catalyst composition solution, a small amount of the conjugated diene monomer may be added into the mixer, that is, the catalyst composition may further comprise the conjugated diene monomer. Therefore, a catalytic activity of the catalyst composition is increased. In addition, an inducing time for the catalyst composition during the polymerization process is decreased. Timing for adding the conjugated diene monomer into the catalyst composition may be any timing when each of the catalyst substances was added. An amount of the conjugated diene monomer may be based on the (a) lanthanide series metal organic carboxylate compound. In some embodiments, the mole of the (a) lanthanide series metal organic carboxylate: a mole of the conjugated diene monomer is 1:0~1:1000, preferably 1:0.5~1:500, more preferably 1:2~1:100. The conjugated diene monomer may be an isoprene, a butadiene, or 1,3-pentadiene, etc.

In another embodiment, in the step for polymerizing the conjugated diene monomers, the conjugated diene monomer may be pumped into a reaction tank before or after the catalyst composition is added, or between timings of adding one catalyst substance of the catalyst composition and another catalyst substance of the catalyst composition. The amount of conjugated diene monomer may be added only once, or added by fractional steps. In some embodiments, the reaction tank is equipped with a stirrer preferably. One reaction tank or a plurality of reaction tanks connected in series may be used. A batch feeding method is preferable. As the polymerization reaches a specific conversion ratio, the modifier is added into the polymer solution in the reaction tank. A mole ratio of the modifier to the lanthanide series metal in the catalyst composition is 0.1~3, preferably 0.19~2.8, more preferably 0.38~1.55.

In another embodiment, the polymerization reaction of the conjugated diene monomer may be carried out in the presence of a solvent. The solvent may be an inertia hydrocarbon compound comprising an aliphatic compound, a cyclic aliphatic compound, an aromatic compound, a mono olefin compound or a combination thereof. The hydrocarbon compound comprises: an aliphatic hydrocarbon compound with 4~8 carbon atoms, a cyclo aliphatic hydrocarbon compound with 5~10 carbon atoms, an aromatic hydrocarbon compound with 6~9 carbon atoms, a mono olefin compound with 4~8 carbon atoms, or a combination thereof. The hydrocarbon compound comprises, but is not limited to: n-butane, n-pentane, n-hexane, n-heptane, cyclohexane, cyclohexane, benzene, methyl benzene, dimethylbenzene, 1-butene and 1-pentene. Preferably, the solvent without aromatic hydrocarbon is used. In some embodiments, with a consideration of catalyst activity, the polymerization reaction may be preferably carried out in the presence of following hydrocarbon compounds: C4-C8 fatty hydrocarbon compounds, C5-C10 cyclic aliphatic hydrocarbon compounds, C4-C8 mono olefin compounds, or a combination thereof. In some embodiments, n-hexane and cyclohexane of the inertia hydrocarbon compound is preferably used.

In another embodiment, the modifier may comprise a polythiol ester compound, a polythiol alkane compound or a combination thereof.

The polythiol ester compound may have a chemical formula (I):

R$a$-(O—C(=O)R$b$-SH)$x$     (I).

x may be an integer of 2~4. Ra is a x-valent act aliphatic hydrocarbon residue with 4~8 carbon atoms, a cyclo aliphatic hydrocarbon residue with 5~10 carbon atoms or an aromatic hydrocarbon residue with 6~9 carbon atoms. Rb is an aliphatic hydrocarbon residue with 1~5 carbon atoms.

In some embodiments, the polythiol ester compound may be a pentaerythritol ester mixture containing thiol groups, composed of a carboxylic ester compound having a sulfhydryl functional group. The carboxylic group is a straight chain aliphatic acid group with 1~10 carbon atoms. The pentaerythritol ester compound may comprise pentaerythritol dithiol fatty acid ester, pentaerythritol trithiol fatty acid ester, pentaerythritol tetrathiol thiol fatty acid ester, pentaerythrityl tetra(3-mercaptopropionate) (PETP), trimethylolpropane tris (3-mercaptopropionate) (TMTP), 1,4-butanediol bis(thioglycolate) or a combination thereof.

In another embodiment, the polythiol alkane compound may have a chemical formula (II):

m and n are independently an integer of 0~10.
Rd has a structural formula (III):

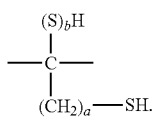

a is an integer of 0~10, and b is an integer of 0~1.

For example, the polythiol alkane compound comprises 1,2,3-Trimercaptopropane (TMCP), 1,10-Decanedithiol (DDT), pentaerythritol tetrathiol or a combination thereof.

In some embodiments, the modifier is one of a pentaerythritol ester compound, 1,2,3-trimercaptopropane, trimethylolpropane tris(3-mercaptopropionate) (TMTP), 1,10-decanedithiol and 1,4-butanediol bis(thioglycolate) (BDTG).

The modifying step may be carried out in the presence of an accelerator. A mole ratio of the modifier to the accelerator is 4.4~6.8.

In some embodiments, the tetrathiol ester compound is used as the modifier, the mole ratio of the modifier to the accelerator (the mole of the modifier/the mole of the accelerator) is 6.2.

In some embodiments, the trithiol ester compound is used as the modifier, the mole ratio of the modifier to the accelerator (the mole of the modifier/the mole of the accelerator) is 4.4~6.8.

In some embodiments, the dithiol ester compound is used as the modifier, the mole ratio of the modifier to the accelerator (the mole of the modifier/the mole of the accelerator) is 4.6~6.3.

In another embodiment, the accelerator may comprise t-butyl hydroperoxide, p-menthane hydroperoxide, di-t-butyl peroxide, di-cumyl peroxide, lauoryl perioxide, t-butyl perbenzoate, 1,1'-azobis(cyclohexane-carbonitrile), azobisisobutyronitrile (AlBN), 1,1-Bis(t-butyl peroxy)3,3,5-trimethyl cyclohexane, or a combination thereof.

In another embodiment, the accelerator may comprise a peroxy acyl compound, a peroxy ester compound, a peroxy ketal compound, a peroxy carbonate compound, or an azo compound having a nitro group and a heterocyclic group. For example, the peroxy acyl compound comprises peroxy dibenzo benzamide, lauroyl peroxide, or phthaloyl diazonium polymetaphenylene, etc. For example, the peroxy ester compound comprises tert-butyl perbenzoate, tert-amyl perbenzoate, tert-butyl peracetate, tert-amyl peracetate, tert-butyl (3,3,5-trimethyl peroxy hexanoate), ditert-butyl peroxy hexa-hydroxy p-phenylene dicarboxylic acid, ditert-amyl peroxy azelate, tert-butyl peroxy isobutyric acid, ditert-butyl trimethyl peroxy adipic acid, 2,5-dimethyl group-2,5-di-tert-pentylphenoxy formyl peroxy hexane, or peroxy azelaic neopentyl ester, etc. For example, the peroxy ketal compound comprises 1,1-ditert-butyl peroxy cyclohexane, 1,1-ditert-butyl peroxy-3,5,5-trimethyl cyclohexane, 1,1-ditert-amyl peroxy cyclohexane, 1,1-ditert-amyl peroxy-3,3,5-trimethyl cyclohexane, 2,2-ditert-butyl peroxy butane, 4,4-ditert-butyl peroxy glyceric triamyl butyl ester, or 2,2-di(4,4-tert-butyl peroxy cyclohexane) propane, etc. For example, the peroxy carbonate compound comprises tert-butyl peroxy isopropyl carbonate, tert-butyl peroxy allyl carbonate, diethylene glycol die(tert-butyl peroxy carbonate), or hexanediol di(tert-butyl peroxy carbonate), etc. For example, the azo compound having the nitro group and the heterocyclic group comprises 1,1'-azo cyclohexane-1-nitrile, or 1,1'-azo dimethyl cyclohexane-1-nitrile, etc.

The modifying step may be carried out in the presence of the catalyst composition.

In another embodiment, after the high cis conjugated diene polymer is reacted with the modifier to obtain the modified high cis conjugated diene polymer, a evaporating step such as direct devolatilizing by an extruder, a stripping step, and a drying step etc., may be proceeded to obtained the more pure modified high cis conjugated diene polymer.

The invention may be better understood by reference to the following embodiments.

<Catalyst Composition Preparation>

0.162 mole of neodymium neodecanoate, 1.296 mole of di-isobutyl aluminum hydride (DIBAH) and 0.486 mole of diethylaluminum chloride (DEAC) are mixed in a n-hexane solvent at room temperature. The mass content of Nd element is 0.26 wt % of the catalyst composition. The mole of neodymium neodecanoate: the total mole of the diethylaluminum chloride and the di-isobutyl aluminum hydride is 1:11. The mole of neodymium neodecanoate: the mole of diethylaluminum chloride is controlled to be 1:3.

<Modified High Cis Conjugated Diene Polymer>

Preparing methods for the modified high cis conjugated diene polymer in embodiments 1~16 are similar except the kinds of the modifier, the amount of the modifier, and the mole ratio of the modifier to the accelerator (i.e. the mole of the modifier/the mole of the accelerator), as shown in table 1. The modifier is pentaerythrityl tetra(3-mercaptopropionate) (PETP) in embodiments 1~3,1,2,3-Trimercaptopropane (TMCP) in embodiments 4~7, 1,10-decanedithiol (DDT) in embodiments 8~10, trimethylolpropane tris(3-mercaptopropionate) (TMTP) in embodiments 11~13, and 1,4-butanediol bis(thioglycolate) (BDTG) in embodiments 14~16.

In the following description, the term "phr" where used, refers to "parts of a respective material per 100 parts by weight of high cis conjugated diene polymer.

TABLE 1

| | modifier | Amount of modifier (phr) | Mole of modifier/ mole of Nd | Mole of modifier/mole of accelerator |
|---|---|---|---|---|
| Embodiment 1 | PETP | 0.050 | 0.51 | 2.1 |
| Embodiment 2 | PETP | 0.100 | 1.02 | 4.1 |
| Embodiment 3 | PETP | 0.150 | 1.53 | 6.2 |
| Embodiment 4 | TMCP | 0.015 | 0.52 | 2.1 |
| Embodiment 5 | TMCP | 0.029 | 1.02 | 4.1 |
| Embodiment 6 | TMCP | 0.043 | 1.54 | 6.2 |
| Embodiment 7 | TMCP | 0.046 | 1.64 | 6.6 |
| Embodiment 8 | DDT | 0.021 | 0.52 | 2.1 |
| Embodiment 9 | DDT | 0.042 | 1.02 | 4.1 |
| Embodiment 10 | DDT | 0.064 | 1.55 | 6.2 |
| Embodiment 11 | TMTP | 0.012 | 0.15 | 1.8 |

TABLE 1-continued

| | modifier | Amount of modifier (phr) | Mole of modifier/ mole of Nd | Mole of modifier/mole of accelerator |
|---|---|---|---|---|
| Embodiment 12 | TMTP | 0.029 | 0.36 | 4.4 |
| Embodiment 13 | TMTP | 0.045 | 0.56 | 6.8 |
| Embodiment 14 | BDTG | 0.009 | 0.19 | 2.3 |
| Embodiment 15 | BDTG | 0.018 | 0.38 | 4.6 |
| Embodiment 16 | BDTG | 0.025 | 0.52 | 6.3 |
| Comparative example 17 | SnCl$_4$ | 0.210 | 4.03 | No accelerator |

The preparing method for the modified high cis conjugated diene polymer in embodiment 1~comparative example 17 as following, 60 Kg of n-hexane is poured into the reaction tank, and the temperature of the reaction tank is set to be heated to 60° C. After 9 Kg of butadiene is poured into the reaction tank, 2 Kg of n-hexane is poured into the reaction tank. Then, 1000 g of the catalyst composition having 0.26 wt % of Nd prepared in the step of <CATALYST COMPOSITION PREPARATION> is added into the reaction tank. After the temperature of the reaction tank reaches the highest (60° C.), the modifier with the amount (using n-hexane as solvent) shown in table 1 is poured into the reaction tank. After the reaction is proceeded for about 10 minutes, the accelerator of the amount as shown in table 1 (showing no accelerator is added in comparative example 17) is added. After the reaction is proceeded in 85° C. for about 3 hours, the product is discharged and then stripped and dried. Therefore, the modified high cis conjugated diene polymer is obtained. This polymer is analyzed to have 98% of the cis structure by comparing absorption for infrared of 740 cm$^{-1}$ with the standard sample.

Table 2~4 show characteristics of the modified high cis conjugated diene polymer in embodiment 1 comparative example 17.

TABLE 2

| | Mooney viscosity (MU) | weight average molecular weight (ten thousand) | number average molecular weight (ten thousand) | PDI |
|---|---|---|---|---|
| Embodiment 1 | 29 | 60.9 | 25.5 | 2.39 |
| Embodiment 2 | 28 | 59.9 | 24.1 | 2.48 |
| Embodiment 3 | 28 | 58.2 | 25.0 | 2.33 |
| Embodiment 4 | 28 | 58.0 | 24.2 | 2.40 |
| Embodiment 5 | 27 | 56.8 | 22.8 | 2.49 |
| Embodiment 6 | 28 | 58.0 | 24.4 | 2.38 |
| Embodiment 7 | 29 | 59.1 | 24.1 | 2.45 |
| Embodiment 8 | 26 | 56.4 | 23.4 | 2.41 |
| Embodiment 9 | 27 | 58.0 | 23.2 | 2.5 |
| Embodiment 10 | 26 | 56.8 | 23.0 | 2.47 |
| Embodiment 11 | 30 | 60.3 | 25.0 | 2.41 |
| Embodiment 12 | 31 | 60.0 | 25.2 | 2.46 |
| Embodiment 13 | 29 | 59.9 | 24.7 | 2.42 |
| Embodiment 14 | 28 | 58.2 | 23.6 | 2.46 |
| Embodiment 15 | 31 | 61.5 | 25.5 | 2.41 |
| Embodiment 16 | 30 | 60.0 | 25.1 | 2.39 |
| Comparative example 17 | 28 | 61.1 | 24.6 | 2.48 |

The polydispersity index (PDI) shown in table 2 is obtained by dividing the weight average molecular weight by the number average molecular weight (Mw/Mn). The weight average molecular weight (Mw) and the number average molecular weight (Mn) are measured by using the weight average molecular weight obtained by the calibration obtained from the commercially available standard polystyrene, and using the GPC (Gel Permeation Chromatography/Waters Company) having a differential refractive index detecting function and a light scattering detecting function.

The Mooney viscosity in table 2 is measured by the MV-2000 equipment according to ASTM D-1646 method. The measuring temperature is 100° C. The measuring time is 1+4 minutes.

Referring to table 2, the PDI of the modified high cis conjugated diene polymer in embodiments 1~16 is similar with the PDI of the modified high cis conjugated diene polymer in comparative example 17.

TABLE 3

| | Mooney viscosity (MU) | weight average molecular weight (ten thousand) | number average molecular weight (ten thousand) | PDI |
|---|---|---|---|---|
| Embodiment 1 | 34 | 68.6 | 25.3 | 2.71 |
| Embodiment 2 | 37 | 71.0 | 24.9 | 2.85 |
| Embodiment 3 | 41 | 75.2 | 24.0 | 3.14 |
| Embodiment 4 | 33 | 68.1 | 24.4 | 2.79 |
| Embodiment 5 | 37 | 70.0 | 22.7 | 3.08 |
| Embodiment 6 | 45 | 76.8 | 23.6 | 3.26 |
| Embodiment 7 | 48 | 79.2 | 23.3 | 3.42 |
| Embodiment 8 | 36 | 70.3 | 22.7 | 3.1 |
| Embodiment 9 | 41 | 75.9 | 22.4 | 3.39 |
| Embodiment 10 | 47 | 78.6 | 22.1 | 3.55 |
| Embodiment 11 | 33 | 67.9 | 26.3 | 2.58 |
| Embodiment 12 | 43 | 73.0 | 23.2 | 3.15 |
| Embodiment 13 | 50 | 81.3 | 24.4 | 3.33 |
| Embodiment 14 | 39 | 73.7 | 23.5 | 3.13 |
| Embodiment 15 | 47 | 78.5 | 22.5 | 3.19 |
| Embodiment 16 | 52 | 82.6 | 23.2 | 3.57 |
| Comparative example 17 | 45 | 75.7 | 24.9 | 3.01 |

The polydispersity index (PDI) shown in table 3 is obtained by dividing the weight average molecular weight by the number average molecular weight (Mw/Mn). The weight average molecular weight (Mw) and the number average molecular weight (Mn) are measured by using the weight average molecular weight obtained by the calibration obtained from the commercially available standard polystyrene, and using the GPC (Waters Company) having a differential refractive index detecting function and a light scattering detecting function.

The Mooney viscosity in table 3 is measured by the MV-2000 equipment according to ASTM D-1646 method. The measuring temperature is 100° C. The measuring time is 1+4 minutes.

TABLE 4

| | ΔM | T-cp | cold flow |
|---|---|---|---|
| Embodiment 1 | 5 | 188 | 50% |
| Embodiment 2 | 9 | 177 | 47% |
| Embodiment 3 | 13 | 150 | 42% |
| Embodiment 4 | 5 | 180 | 52% |
| Embodiment 5 | 10 | 169 | 49% |
| Embodiment 6 | 17 | 141 | 43% |
| Embodiment 7 | 19 | 132 | 39% |
| Embodiment 8 | 10 | 168 | 53% |

TABLE 4-continued

| | ΔM | T-cp | cold flow |
|---|---|---|---|
| Embodiment 9 | 14 | 138 | 48% |
| Embodiment 10 | 21 | 123 | 39% |
| Embodiment 11 | 3 | 177 | 51% |
| Embodiment 12 | 12 | 166 | 45% |
| Embodiment 13 | 21 | 128 | 37% |
| Embodiment 14 | 11 | 164 | 50% |
| Embodiment 15 | 16 | 133 | 39% |
| Embodiment 16 | 22 | 128 | 35% |
| Comparative example 17 | 17 | 163 | 45% |

The Mooney viscosity difference (ΔM) in table 4 indicates the difference value between the Mooney viscosity of the modified high cis conjugated diene polymer in table 3 and the Mooney viscosity of the modified high cis conjugated diene polymer in table 2.

The T-cp in table 4 indicates the solution viscosity (unit: cps) of the toluene solution having 5 wt % of the modified high cis conjugated diene polymer.

The cold flow in table 4 is tested by the cold flow testing method by putting a 1 Kg poise on the sample of 40 mm×40 mm×50 mm.

Cold flow %=$(H_0-H_t)/H_0 \times 100\%$ $H_0$ means the height (50 mm) of the modified high cis conjugated diene polymer at 0 minute.

$H_t$ means the height of the modified high cis conjugated diene polymer at 120 minute.

Referring to tables 1~4, when using the tetrathiol, such as the pentaerythritol ester compound, as a modifier and the mole ratio of the tetrathiol modifier to the accelerator (i.e. the mole of the modifier/the mole of the accelerator) is 6.2, as shown in embodiment 3, the Mooney viscosity of which is close to that of comparative example 17, and the cold flow is improved.

Referring to tables 1~4, when using trithiol, such as 1,2,3-Trimercaptopropane (TMCP) or trimethylolpropane tris(3-mercaptopropionate) (TMTP), as a modifier and the mole ratio of the trithiol modifier to the accelerator (i.e. the mole of the modifier/the mole of the accelerator) is 4.4~6.8, as shown in embodiments 6, 7, 12, 13, the Mooney viscosity of which is close to the that of comparative example 17, and the cold flow is improved.

Referring to tables 1~4 again, when using dithiol, such as 1,10-decanedithiol or 1,4-butanediol bis(thioglycolate) (BDTG), as modifier and the mole ratio of the dithiol modifier to the accelerator (i.e. the mole of the modifier/the mole of the accelerator) is 4.6~6.3, the Mooney viscosity of which is close to that of comparative example 17, and the cold flow is improved.

Referring to tables 1~4 again, the results show that the modifiers of embodiments 1~9 (i.e. pentaerythritol ester compound, 1,2,3-trithiol propane or 1,10-decanedithiol) can be used to replace the modifier (SnCl$_4$) in comparative example 17. The conventional SnCl$_4$ modifier has disadvantages of being expensive, hard to reserve, producing HCl as contacting with air, etc, so it must be careful to deliver and reserve the SnCl$_4$ modifier. Using the SnCl$_4$ modifier in the preparing process would result in problems of an over high Mooney viscosity and color change in a local portion of the polymer, etc. due to a local over high SnCl$_4$ concentration. Therefore, using the modifiers that have stable property as described in present invention can decrease the manufacture cost and increase product stability.

While the invention has been described by way of example and in terms of the exemplary embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for preparing a modified conjugated diene polymer, comprising a polymerization step for polymerizing conjugated diene monomers to form a conjugated diene polymer; and a modifying step for reacting the conjugated diene polymer with a modifier to form a modified conjugated diene polymer, wherein the modifying step is carried out in the presence of an accelerator comprising a peroxy acyl compound, a peroxy ester compound, a peroxy ketal compound, a peroxy carbonate compound, or an azo compound having a nitro group and a heterocyclic group, the modifier includes a polythiol ester compound, a polythiol alkane compound or a combination thereof, the polythiol ester compound has a chemical formula (I):

Ra-(O—C(=O)Rb-SH)x    (I),

Ra is a x-valent aliphatic hydrocarbon residue with 4~8 carbon atoms, a cyclo aliphatic hydrocarbon residue with 5~10 carbon atoms, or an aromatic hydrocarbon residue with 6~9 carbon atoms, Rb is an aliphatic hydrocarbon residue with 1~15 carbon atoms, x is an integer of 2~4, the polythiol alkane compound has a chemical formula (II):

HS—(CH$_2$)$_m$—(Rd)$_n$CH$_2$SH    (II), m and n are independently an integer of 0~10, Rd has a structural formula (III),

(III)

a is an integer of 0~10, b is an integer of 0~1.

2. The method for preparing the modified conjugated diene polymer according to claim 1, wherein a mole ratio of the modifier to the accelerator is 4.4~6.8.

3. The method for preparing the modified conjugated diene polymer according to claim 2, wherein the modifier is an ester compound having three thiol groups, a mole ratio of the ester compound having three thiol groups to the accelerator is 4.4~6.8.

4. The method for preparing the modified conjugated diene polymer according to claim 2, wherein the modifier is an ester compound having two thiol groups, a mole ratio of the ester compound having two thiol groups to the accelerator is 4.6~6.3.

5. The method for preparing the modified conjugated diene polymer according to claim 1, wherein the accelerator comprises t-butyl hydroperoxide, p-menthane hydroperoxide, di-t-butyl peroxide, di-cumyl peroxide, lauoryl perioxide, t-butyl perbenzoate, 1,1'-azobis(cyclohexane-carbonitrile), azobisisobutyronitrile, 1,1-Bis(t-butyl peroxy)3,3,5-trimethyl cyclohexane, or a combination thereof.

6. The method for preparing the modified conjugated diene polymer according to claim 1, wherein the peroxy acyl compound comprises peroxy dibenzo benzamide, lauroyl peroxide, or phthaloyl diazonium polymetaphenylene.

7. The method for preparing the modified conjugated diene polymer according to claim 1, wherein the peroxy ester compound comprises tert-butyl perbenzoate, tert-amyl perbenzoate, tert-butyl peracetate, tert-amyl peracetate, tert-butyl (3,3,5-trimethyl peroxy hexanoate), ditert-butyl peroxy hexahydroxy p-phenylene dicarboxylic acid, ditert-amyl peroxy azelate, tert-butyl peroxy isobutyric acid, ditert-butyl trimethyl peroxy adipic acid, 2,5-dimethyl group-2,5-di-tert-pentylphenoxy formyl peroxy hexane, or peroxy azelaic neopentyl ester.

8. The method for preparing the modified conjugated diene polymer according to claim 1, wherein the peroxy ketal compound comprises 1,1-ditert-butyl peroxy cyclohexane, 1,1-ditert-butyl peroxy-3,5,5-trimethyl cyclohexane, 1,1-ditert-amyl peroxy cyclohexane, 1,1-ditert-amyl peroxy-3,3,5-trimethyl cyclohexane, 2,2-ditert-butyl peroxy butane, 4,4-ditert-butyl peroxy glyceric triamyl butyl ester, or 2,2-di(4,4-tert-butyl peroxy cyclohexane) propane.

9. The method for preparing the modified conjugated diene polymer according to claim 1, wherein the peroxy carbonate compound comprises tert-butyl peroxy isopropyl carbonate, tert-butyl peroxy allyl carbonate, diethylene glycol die(tert-butyl peroxy carbonate), or hexanediol di(tert-butyl peroxy carbonate).

10. The method for preparing the modified conjugated diene polymer according to claim 1, wherein the azo compound having the nitro group and the heterocyclic group comprises 1,1'-azo cyclohexane-1-nitrile, or 1,1'-azo dimethyl cyclohexane-1-nitrile.

11. The method for preparing the modified conjugated diene polymer according to claim 1, wherein the modifier comprises pentaerythritol dithiol fatty acid ester, pentaerythritol trithiol fatty acid ester, pentaerythritol tetrathiol thiol fatty acid ester, pentaerythrityl tetra(3-mercaptopropionate), 1,2,3-trimercaptopropane, 1,10-decanedithiol, trimethylolpropane tris(3-mercaptopropionate), 1,4-butanediol bis(thioglycolate), pentaerythritol tetrathiol or a combination thereof.

12. The method for preparing the modified conjugated diene polymer according to claim 1, wherein the polymerization step is carried out in the presence of a catalyst composition, the catalyst composition comprises:
a conjugated diene monomer;
a lanthanide series metal organic carboxylate;
an organic aluminum compound composed of an aluminium alkyl having a molecular formula of $AlR'_3$, $HAlR'_2$ or $R'AlH_2$, R' is an alkyl group with 2~6 carbon atoms; and
a Lewis acid composed of an alkylaluminum halide.

13. The method for preparing the modified conjugated diene polymer according to claim 12, wherein the modifying step is carried out in the presence of the catalyst composition.

14. The method for preparing the modified conjugated diene polymer according to claim 12, wherein a mole of the lanthanide series metal organic carboxylate: a total mole of the Lewis acid and the organic aluminum compound is 1:1.5~1:60, and the mole of the lanthanide series metal organic carboxylate: the mole of the Lewis acid is 1:0.5~1:10.

15. The method for preparing the modified conjugated diene polymer according to claim 1, wherein the conjugated diene polymer is formed by the polymerization step using a conjugated diene monomer, the conjugated diene monomer comprises 1,3-butadiene, isoprene, 2-phenylbutadiene, 2,3-dimethylbutadiene, 1,3-hexadiene, 1,3-octadiene, or a combination thereof.

16. A modified conjugated diene polymer, wherein the modified conjugated diene polymer is prepared by the method according to claim 1.

17. The modified conjugated diene polymer according to claim 16, wherein the modified conjugated diene polymer is a modified high cis conjugated diene polymer having a cis-1,4-structure over 97%.

18. The modified conjugated diene polymer according to claim 16, wherein a weight average molecular weight of the modified conjugated diene polymer is 20,000~1,000,000.

* * * * *